(12) United States Patent
Griffin et al.

(10) Patent No.: US 12,705,699 B2
(45) Date of Patent: Aug. 11, 2026

(54) GENERATING TOP VIEW OF VEHICLE WITH IMAGE HARMONIZATION BASED ON CAMERA ORIENTATION

(71) Applicant: Connaught Electronics Ltd., Tuam (IE)

(72) Inventors: Mark Patrick Griffin, Troy, MI (US); David James Moylan, Troy, MI (US); Satya Syamala Rao Giddi, Troy, MI (US)

(73) Assignee: Connaught Electronics Ltd. (IE)

( * ) Notice: Subject to any disclaimer, the term of this patent is extended or adjusted under 35 U.S.C. 154(b) by 54 days.

(21) Appl. No.: 18/663,422

(22) Filed: May 14, 2024

(65) Prior Publication Data

US 2025/0356461 A1 Nov. 20, 2025

(51) Int. Cl.

*G06T 5/50* (2006.01)
*G06T 5/70* (2024.01)
*H04N 5/262* (2006.01)

(52) U.S. Cl.

CPC .................. *G06T 5/50* (2013.01); *G06T 5/70* (2024.01); *H04N 5/2624* (2013.01); *G06T 2207/10024* (2013.01); *G06T 2207/20021* (2013.01); *G06T 2207/20212* (2013.01); *G06T 2207/30252* (2013.01)

(58) Field of Classification Search

CPC ... G06T 5/50; G06T 5/70; G06T 2207/10024; H04N 5/2624

See application file for complete search history.

(56) References Cited

U.S. PATENT DOCUMENTS

| | | | |
|---|---|---|---|
| 6,486,908 | B1 | 11/2002 | Chen et al. |
| 8,130,292 | B2 | 3/2012 | Lee |
| 9,311,706 | B2 | 4/2016 | Natroshvili et al. |

(Continued)

FOREIGN PATENT DOCUMENTS

| | | | |
|---|---|---|---|
| DE | 102016121755 | A1 | 5/2018 |
| DE | 102018110597 | A1 | 11/2019 |

(Continued)

OTHER PUBLICATIONS

Written Opinion and International Search Report for PCT/US2025/029134, Dated Sep. 19, 2025, All together 9 Pages.

*Primary Examiner* — On S Mung
(74) *Attorney, Agent, or Firm* — Dickinson Wright PLLC

(57) ABSTRACT

Methods and systems for generating a top view of an area surrounding the vehicle. Images are received from a plurality of vehicle cameras configured to view respective regions of ground outside of the vehicle. Portions of at least some of the regions overlap with portions of another of the regions, defining overlapping portions. Each image is segmented into a respective plurality of segments, wherein the overlapping portions include some of the segments of one image and some of the segments of another image to define overlapping segments. A first harmonization model harmonizes the images based on brightness or color values within the overlapping segments. When an angular orientation of at least one of the plurality of vehicle cameras relative to the ground exceeds a threshold, a second harmonization model is executed in order to account for occlusions or lack of image data when the camera is angled.

20 Claims, 10 Drawing Sheets

(56) References Cited

U.S. PATENT DOCUMENTS

| | | | | |
|---|---|---|---|---|
| 9,357,208 | B2 | 5/2016 | Gupta et al. | |
| 9,723,272 | B2 | 8/2017 | Lu et al. | |
| 9,762,880 | B2 | 9/2017 | Pflug | |
| 10,089,538 | B2 | 10/2018 | Molin et al. | |
| 10,129,518 | B2 | 11/2018 | Pflug | |
| 10,654,423 | B2 | 5/2020 | Gupta et al. | |
| 11,158,056 | B2 | 10/2021 | Lukac et al. | |
| 2021/0321038 | A1 | 10/2021 | Raproeger et al. | |
| 2022/0321836 | A1* | 10/2022 | Friebe | G06T 7/74 |

FOREIGN PATENT DOCUMENTS

| | | | |
|---|---|---|---|
| TW | I805848 | B | 6/2023 |
| WO | 2018087348 | A1 | 5/2018 |

* cited by examiner

Default Harmonization

Adapted Harmonization

GENERATING TOP VIEW OF VEHICLE WITH IMAGE HARMONIZATION BASED ON CAMERA ORIENTATION

TECHNICAL FIELD

The present disclosure relates to methods and systems for generating composite images of an environment outside of a motor vehicle, utilizing harmonization techniques that are based on the angular orientation of the vehicle cameras.

BACKGROUND

To assist with parking or maneuvering during slow speeds, vehicles can be equipped with the ability to generate a top view on the vehicle display (e.g., infotainment screen). The top view, also referred to as a top-down view, an above view, or a bird's view, is generated by stitching together images from various cameras located about the vehicle. The images are processed, analyzed and stitched together to offer a synthetic but positionally-accurate top view of the vehicle and its 360-degree surroundings; it appears to the driver as if a single image is taken of the vehicle and its surroundings from directly above the vehicle.

SUMMARY

According to an embodiment, a method for generating a top view of an area surrounding the vehicle is provided. The method includes: receiving images from a plurality of vehicle cameras, wherein each vehicle camera is configured to view a respective region of ground outside of the vehicle, and wherein portions of at least some of the regions overlap with portions of another of the regions to define overlapping portions; segmenting each image into a respective plurality of segments, wherein the overlapping portions include some of the segments of one image and some of the segments of another image to define overlapping segments; executing a first harmonization model to harmonize the images based on brightness values or color values within the overlapping segments; determining an angular orientation of at least one of the plurality of vehicle cameras relative to the ground; and executing a second harmonization model to harmonize the images based on the brightness values or color values within the overlapping segments, wherein the executing of the second harmonization model is performed in response to a determination that the angular orientation of the at last one of the plurality of vehicles cameras exceeds a threshold.

According to another embodiment, a method for generating a top view of an area surrounding a vehicle is provided. The method includes: receiving images from a plurality of vehicle cameras, wherein the images are associated with a respective region of ground outside of the vehicle, wherein portions of at least some of the regions overlap with portions of another of the regions to define overlapping portions; segmenting each image into a respective plurality of segments, wherein the overlapping portions include some of the segments of one image and some of the segments of another image to define overlapping segments; determining an angular orientation of at least one of the plurality of vehicle cameras relative to the ground; and harmonizing the images by altering brightness values or color values within the overlapping segments to generate the top view of the area surrounding the vehicle, wherein the harmonizing is performed based on the determined angular orientation.

According to another embodiment, a system for generating a top view of an area surrounding the vehicle includes a plurality of vehicle cameras, each vehicle camera configured to view a respective region of ground outside of the vehicle, wherein portions of at least some of the regions overlap with portions of another of the regions to define overlapping portions. The system includes at least one processor coupled to the vehicle cameras and programmed to: receive images generated by the vehicle cameras, segment each image into a respective plurality of segments, wherein the overlapping portions include some of the segments of one image and some of the segments of another image to define overlapping segments, execute a first harmonization model to harmonize the images based on brightness values or color values within the overlapping segments, receive an angular orientation of at least one of the plurality of vehicle cameras relative to the ground, and execute a second harmonization model to harmonize the images based on the brightness values or color values within the overlapping segments, wherein the execution of the second harmonization model is performed in response to a determination that the angular orientation of the at least one of the plurality of vehicles cameras exceeds a threshold.

DETAILED DESCRIPTION

Figure 1:
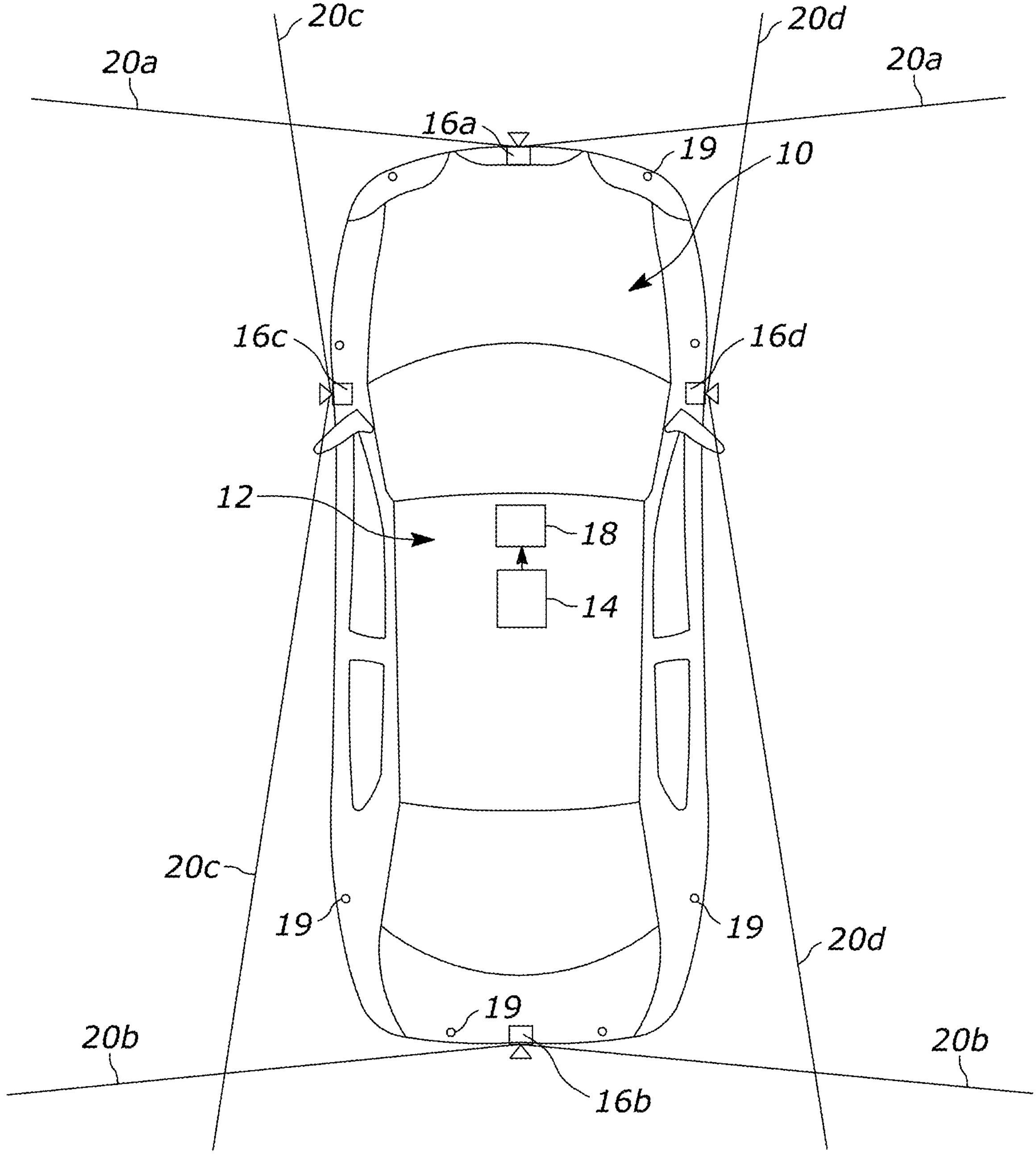
FIG. 1 illustrates a schematic of a vehicle having a vehicle camera system including a plurality of vehicle cameras, according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical application. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

As explained in the Background, automotive vehicles (e.g., cars, trucks, vans, SUVs, etc.) can be equipped with a camera system that generates a top view on the vehicle display (e.g., infotainment screen, dashboard unit, tablet, mobile device, phone, etc.). The top view, also referred to as a top-down view, an above view, or a bird's view, is generated by stitching together images from various cameras located about the vehicle. The images are processed, analyzed and stitched together to offer a synthetic but positionally accurate top view of the vehicle and its 360-degree surroundings; it appears to the driver as if a single image is taken of the vehicle and its surroundings from directly above the vehicle. This view can assist the driver with parking or slow-speed maneuvering in tight spaces.

These camera systems typically include four or more cameras about the vehicle, mounted at or near the front, the rear, and either side of the vehicle. Each camera can independently have its own image signal processing prior to the images being stitched together. Therefore, the cameras may have different exposure, contrast, brightness, and the like. Since each camera faces in a different direction and sees different surrounding areas of the vehicle, the brightness and color values can be slightly different for each camera. These differences in color (chrominance) and brightness (luminance) can negatively affect the top view. For example, if one camera has a brightness or color exposure that varies greatly from that of another camera, the composite top view may not be aesthetically pleasing due to a corresponding stark change in brightness or color at certain points of the composite top view.

Due to this, harmonization techniques are applied when generating the top view to harmonize the merged camera images with respect to brightness and color. Harmonization algorithms are commonly used in image processing to harmonize fused camera images for brightness and color or luminance and chrominance. In general, harmonization works to perform color and brightness transformation amongst the images of different cameras. The color and brightness statistics of the images, when forming a composite top view, can be averaged and matched. For example, zones of the histogram are predicted or determined which can be best matched between the two images, and then the color is adjusted for both of the images such that the color is consistent in the composite view. German Patent Publication No. DE102016121755 ("the '755 Publication), titled Method For Determining A Composite Image Of A Surrounding Area Of A Motor Vehicle With Adaptation Of Brightness And/Or Color, Camera System And Power Vehicle, is incorporated by reference herein in its entirety. The '755 Publication describes a harmonization technique in which calculated histograms are used as inputs to generate correction values for each camera and each corresponding Y, U, and V channel. The harmonization can be particularly helpful in areas that are seen by two or more of the cameras (in other words, areas where the views from the vehicle cameras overlap). German Patent Publication No. DE102018110597 ("the '597 Publication"), titled Method for Image Harmonization, Image Processing Device, Camera System and Motor Vehicle, is also incorporated by reference herein in its entirety. The '597 Publication described a harmonization technique in which a color analysis of regions of interests of multiple images is performed. A color correction value is determined depending on the color analysis, and is applied to part of the image so that the color of that image is adjusted.

However, the prior art systems do not harmonize very well when one or more of the vehicle cameras does not have the same angular orientation as the others. The vehicle cameras are usually all oriented towards the ground, however under certain circumstances (e.g., packaging constraints), some of the cameras (e.g., the left and/or right side cameras) may be tilted or rotated in a direction facing toward the rear of the vehicle. This is significant because if a camera is oriented in a certain direction relative to facing straight at the ground, this changes the amount of road surface in a direction around the vehicle that is visible in the camera image. This can alter the execution of the harmonization techniques, and the orientation of the cameras is not well accounted for in the prior art.

Therefore, according to various embodiments described herein, a vehicle camera system includes a harmonization processing technique (also referred to as a harmonization algorithm or a harmonization correction algorithm) that is able to operate differently based upon the angular orientation of one or more of the vehicle cameras. When all of the vehicle cameras are rotated or tilted the same as one another (e.g., normal to the ground), a first harmonization algorithm may be utilized according to the prior art systems described above. However, when it is determined that one or more of the cameras is rotated or tilted relative to the others (or relative to an axis normal to the ground), the system can utilize a second harmonization algorithm that accounts for the camera orientation. In some embodiments, the second harmonization algorithm removes or adjusts the brightness values and/or color values of certain regions of the views seen by the rotated/tilted cameras.

FIG. 1 illustrates a schematic of a vehicle 10 according to an embodiment, shown here from a top view. The vehicle 10 is a passenger car, but can be other types of vehicles such as a truck, van, or sports utility vehicle (SUV), or the like. The vehicle 10 includes a camera system 12 which includes an electronic control unit (ECU) 14 connected to a plurality of cameras 16*a*, 16*b*, 16*c*, and 16*d*. In general, the ECU 14 includes one or more processors programmed to process the images data associated with the cameras 16*a-d* and generate a composite top view on a vehicle display 18. In some embodiments, the vehicle 10 includes a plurality of proximity sensors (e.g., ultrasonic sensors, radar, sonar, LiDAR, etc.) 19. The proximity sensors 19 can be connected to their own designated ECU that develops a sensor map of objects external to the vehicle. Alternatively, the proximity sensors can be connected to ECU 14. The output of the proximity sensors 19 can be fused with the output of the cameras 16*a-d* for object detection, for example.

The ECUs disclosed herein may more generally be referred to as a controller. In the case of an ECU of a camera system 12, the ECU can be capable of receiving image data from the various cameras (or their respective processors), processing the information, and outputting instructions to combine the image data in generating a composite top view, for example. In the case of an ECU associated with the proximity sensors 19, the ECU can be capable of receiving sensor data from the various proximity sensors (or their respective processors), processing the information, and outputting a sensor map of objects surrounding the vehicle; this ECU can also be capable of causing alerts to be sent to the driver during parking maneuvers that might warn the driver of the proximity of the detected objects. In this disclosure, the terms "controller" and "system" may refer to, be part of, or include processor hardware (shared, dedicated, or group) that executes code and memory hardware (shared, dedicated, or group) that stores code executed by the processor hardware. The code is configured to provide the features of the controller and systems described herein. In one example, the controller may include a processor, memory, and non-volatile storage. The processor may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory. The memory may include a single memory device or a plurality of memory devices including, but not limited to, random access memory ("RAM"), volatile memory, non-volatile memory, static random-access memory ("SRAM"), dynamic random-access memory ("DRAM"), flash memory, cache memory, or any other device capable of storing information. The non-volatile storage may include one or more persistent data storage devices such as a hard drive, optical drive, tape drive, non-volatile solid-state device, or any other device capable of persistently storing information. The processor may be configured to read into memory and execute computer-executable instructions embodying one or more software programs residing in the non-volatile storage. Programs residing in the non-volatile storage may include or be part of an operating system or an application, and may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/SQL. The computer-executable instructions of the programs may be configured to, upon execution by the processor, cause the harmonization techniques and algorithms described herein.

In the embodiment illustrated in FIG. 1, the cameras 16-*d* are located about different quadrants of the vehicle, although more than four cameras may be provided in the camera system 12. Each camera 16*a-d* may have a fish-eye lens to obtain images with an enlarged field of view, indicated by boundary lines 20*a-d*. In an example, a first camera 16*a* faces an area in front of the vehicle, and captures images with a field of view indicated by boundary lines 20*a*. The first camera 16*a* can therefore be referred to as the front camera. A second camera 16*b* faces an area behind the vehicle, and captures images with a field of view indicated by boundary lines 20*b*. The second camera 16*b* can therefore be referred to as the rear camera. A third camera 16*c* faces an area on the left side of the vehicle, and captures images with a field of view indicated by boundary lines 20*c*. The third camera 16*c* can therefore be referred to as the left camera, or left-side camera. The third camera 16*c* can also be mounted on or near the vehicle's left wing mirror, and can therefore be referred to as a mirror left (ML) camera. A fourth camera 16*d* faces an area on the right side of the vehicle, and captures images with a field of view indicated by boundary lines 20*d*. The fourth camera 16*d* can therefore be referred to as the right camera, or right-side camera. The fourth camera 16*d* can also be mounted on or near the vehicle's right wing mirror, and can therefore be referred to as a mirror right (MR) camera. The images (or the associated image data) originating from the cameras 16*a-d* can be processed by the ECU 14 (e.g., stitched together, distorted, combined, and harmonized) to generate the composite top view on the vehicle display 18.

Figure 2:
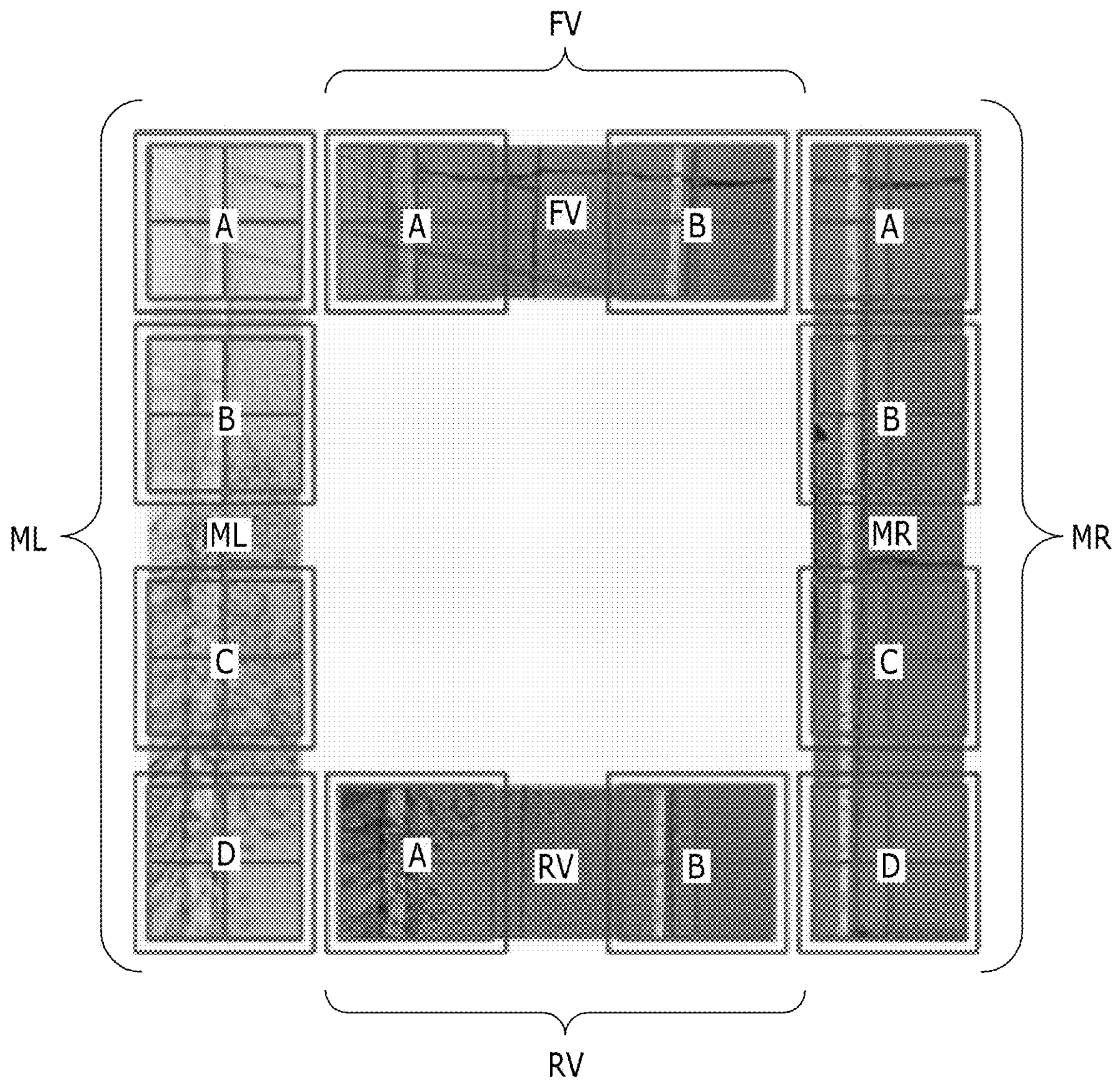
FIG. 2 illustrates four projected image areas (ML, MR, FV, RV) associated with images taken from four of the vehicles cameras of FIG. 1, according to an embodiment. Each projected image area includes a plurality of regions (e.g., A, B, etc.).

FIG. 2 shows a schematic representation of projected image areas captured by the various cameras 16*a-d*. Here, projected images areas associated with each of the cameras 16*a-d* are as follows: the front camera 16*a* produces a projected image of a front view (FV) area; the rear camera 16*b* produces a projected image of a rear view (RV) area; the left-side camera 16*c*, or mirror left camera, produces a projected image (ML) of a left side view area; the right-side camera 16*d*, or mirror right camera, produces a projected image (MR) of a right side view area. Each projected image (ML, MR, FV, RV) can be referred to as projected image areas, as each is a projection of image data onto the overhead space. Each projected image area (ML, MR, FV, RV) represents a top view of a portion of the scene detected from a respective one of the various cameras 16*a-d*.

In addition, the projected image areas FV, RV, ML, MR are divided into several respective regions of interest (ROIs). These regions of interest can be fixed and set per camera. The images from each of the front and rear cameras 16*a-b* can be divided into two ROIs, such as FV-A, FV-B, RV-A and RV-B. The images from each of the side cameras 16*c-d* can be divided into four ROIs such as ML-A, ML-B, ML-C, ML-D, MR-A, MR-B, MR-C, and MR-D. The number of ROIs can be more or less than the number shown in FIG. 2, and can be arbitrary and depend, for example, on the texture size and its relative proportion to the image size of the other cameras. For example, to create a spherical view, the number of ROIs can be different than those illustrated here.

Some of these regions of interest overlap. Note how in FIG. 1, the boundary lines 20*a-d* intersect at various portions. This indicates that a certain portion of each camera's field of view overlaps with a portion of another camera's field of view. This is also shown in FIG. 2. For example, the regions of interest FV-A and ML-A overlap. In other words, an area of the environment outside of the vehicle seen by the left-side camera 16*c* as shown in area ML-A is also seen by the front camera 16*a* as shown in area FV-A. This can be seen in FIG. 2, where the scene of the environment that can be seen in area ML-A is the same as the scene of the environment that can be seen in area FV-A. The same overlap occurs between areas FV-B and MR-A, and between areas RV-B and MR-D, and between areas RV-A and ML-D.

In contrast, some ROIs may not overlap. For example, the scene depicted in areas ML-B, ML-C, MR-B, and MR-C do not overlap with any view from any other camera.

Image harmonization compares the brightness and color components of the same scene content, i.e., in overlapping regions of interest. In these overlapping ROIs, the scene content is the same but the brightness and color of this content can appear different between the different cameras. For example, the scene content shown in region ML-A may be brighter than the same scene content shown in region FV-A. This is due to each camera adjusting parameters (e.g., via its own designated processor) to try and accurately reproduce the entire scene it sees. For example, the front camera 12*a* might see more sky or a bright sun in its view relative to the other cameras, and therefore it reduces its exposure time accordingly so as to not have an oversaturated image. On the other hand, the left-side camera 16*c* might see mostly a dark ground and there increases its exposure accordingly to be able to receive enough light to reproduce the scene. The brightness and color components of each overlapping ROI are analyzed and compared by two or more cameras in the harmonization algorithm. The harmonization algorithm attempts to match the brightness and color components of the overlapping regions of interest (e.g., FV-A and ML-A) to harmonize the image to create a smooth top view. The image harmonization described herein may be performed by the ECU 14, for example.

To improve the robustness of the image harmonization, each region of interest (e.g., FV-A, FV-B, ML-A, ML-B, ML-C, etc.) can be divided further into sub-regions, also referred to as micro blocks or segments. This is shown in FIG. 2, where each area of interest is divided into four sub-regions of interests, or micro blocks. Of course, the number of micro blocks per area of interest need not be four, need not be identical in number or shape or size amongst the areas of interest, and can take the shape or number to fit a particular application. But here, each micro block is represented as a square for simplicity. The image harmonization can be configured to compute or estimate the brightness (luminance) and color (chrominance) for each micro block in each overlapping ROI. This can yield a Y, U, and V estimation value for each micro block. The image harmonization can then adjust the images produced by the cameras so that the brightness and color in the micro blocks in each overlapping ROI matches or is more aligned.

Figure 3A:
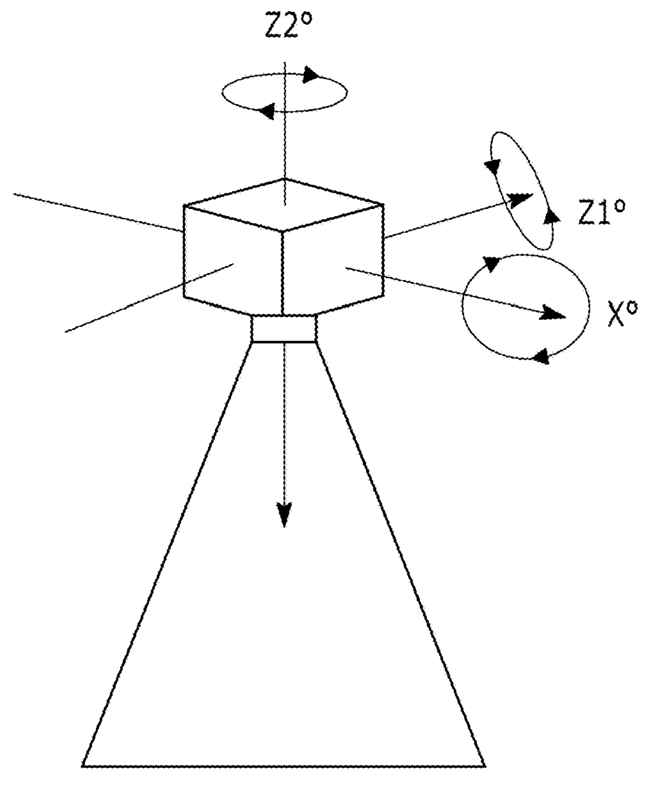
FIG. 3A illustrates a schematic of one of the vehicle cameras pointing generally toward the ground.
Figure 3B:
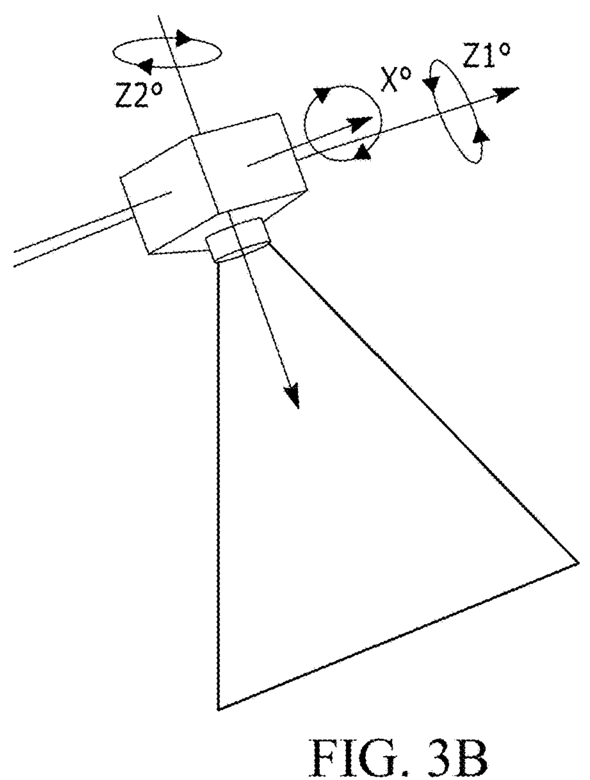
FIG. 3B illustrates a schematic of the same vehicle camera tilted along a Z1 axis toward the rear of the vehicle, according to an embodiment.

As mentioned before, such matching is expected to be relatively reliable in cases where the cameras 16*a-d* are all oriented to a similar or identical angle relative to the ground. Each camera has a certain orientation or position and rotation in a world coordinate system or the vehicle coordinate system (e.g., position X, Y, and Z per distance unit such as millimeters; rotation around the X, Y, and Z axes). FIG. 3A shows a depiction of a camera and its three rotation axes X, Z1 (Y), and Z2 (Z), with the camera pointing straight down toward the ground. FIG. 3B shows another camera that has been oriented about the Z1 (Y) axis, for example facing back toward the rear of the vehicle. For example, larger vehicle variants of certain vehicle models (e.g., pickup trucks) may have a "tow mode" or trailer view in which the side cameras are oriented to face more toward the rear of the vehicle, allowing the user to have a better view of the trailer and environment rearward of the vehicle.

Figure 4A:
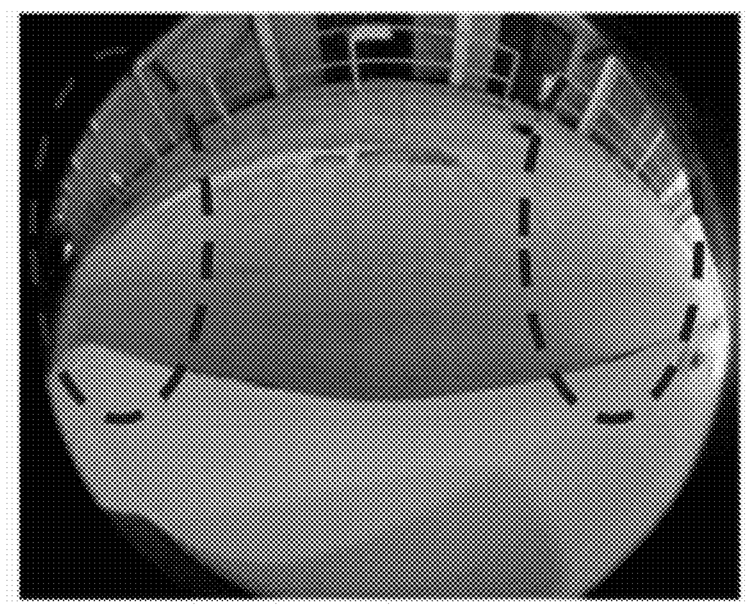
FIG. 4A illustrates an image taken from one of the vehicle cameras pointing generally toward the ground.
Figure 4B:
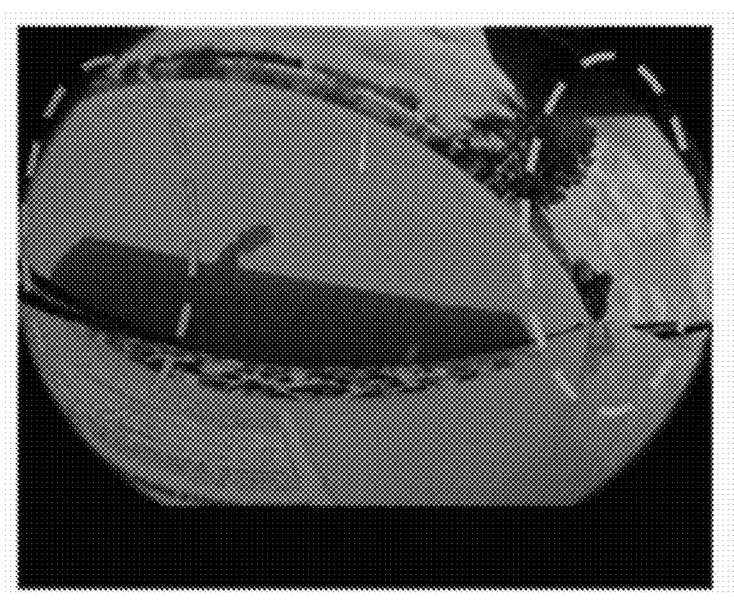
FIG. 4B illustrates an image taken from the same vehicle camera tilted toward the rear of the vehicle, according to an embodiment.

The rotation of one of the cameras (e.g., ML or MR camera) toward the rear of the vehicle can lead to an input image with data predominantly from the rear of the vehicle. For example, FIG. 4A shows a view from a MR camera pointing almost straight down at the road, while FIG. 4B shows a view from a MR camera oriented slightly backwards (e.g., rotation along the Z1 axis). Note how the image in FIG. 4A has the same amount of road in the image on the left and right hand sides of the image, in the dashed ovals. In contrast, in the image of FIG. 4B, more road is visible rear of the vehicle (e.g., the oval on the right) than is visible in front of the vehicle (e.g., the oval on the left).

Figure 5A:
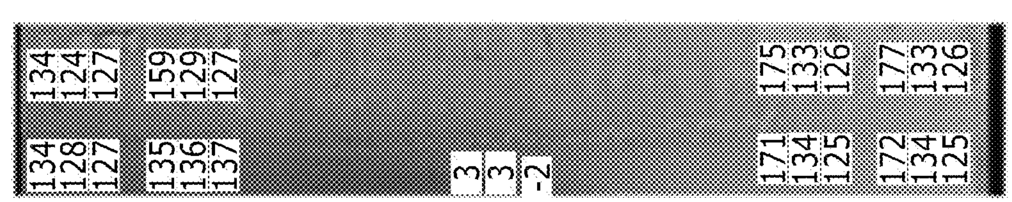
FIG. 5A illustrates an image taken from one of the vehicle cameras pointing generally toward the ground, and an associated projected image area.
Figure 5A:
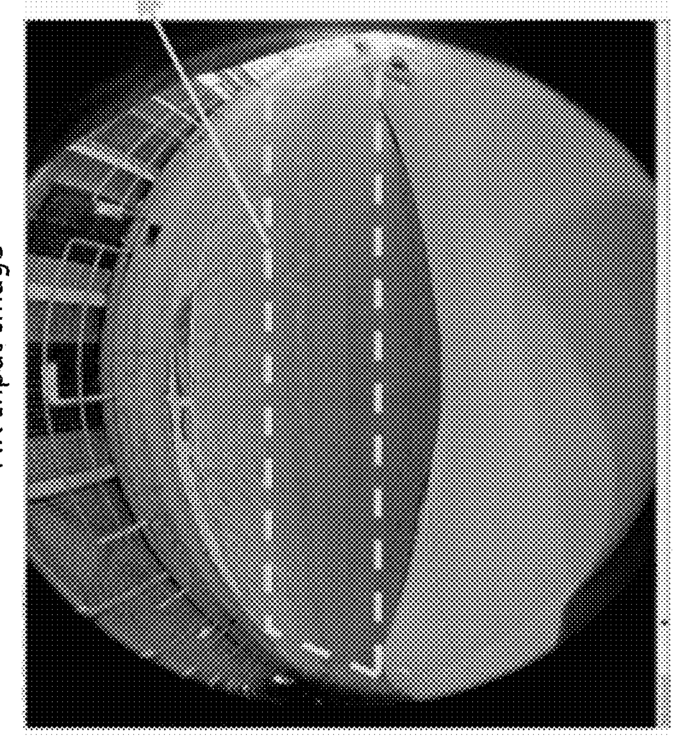
Figure 5B:
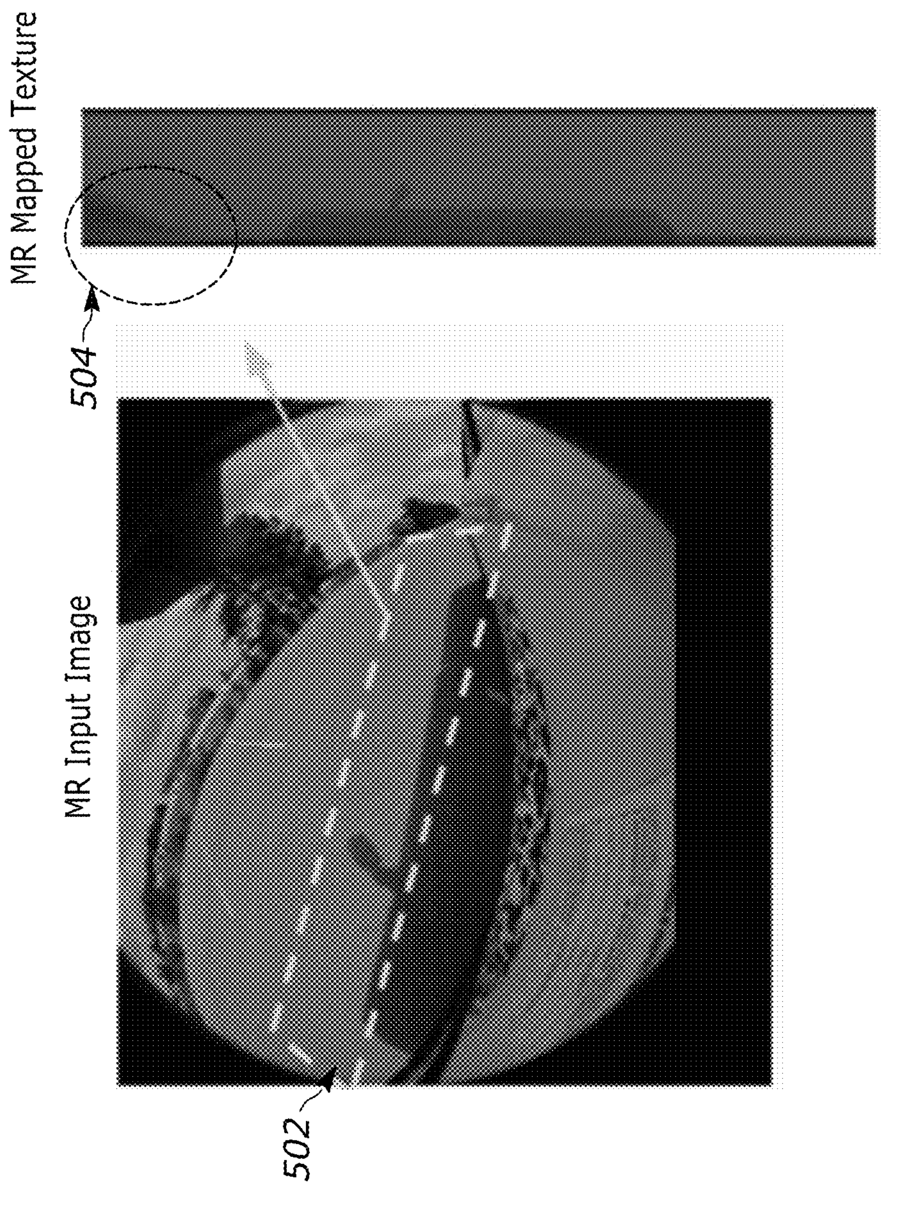
FIG. 5B illustrates an image taken from the same vehicle camera tilted toward a rear of the vehicle, and an associated projected image area.

The reduction in the road surface visible toward the front of the vehicle can be very significant for the harmonization algorithm. For example, FIG. 5A shows a camera image taken from a MR camera pointing straight down at the ground (left), along with a projected image or mapped texture image (right). The projected image represents an overhead view of the input image, and one or more image projection techniques may be utilized. The pixels in the dashed area of the input image are used to form the projected image (similar to the MR view of FIG. 2). The dashed area of pixels corresponds to a real-world area outside of the vehicle. In contrast, FIG. 5B shows a camera image taken from a MR camera that is tilted slightly back toward the rear of the vehicle. Here, the dashed area of pixels corresponds to the same real-world area outside of the vehicle that is used for creation of the projected image. The dashed area in FIG. 5B now includes an area 502 that corresponds to a region of the real-world area that is no longer visible by the MR camera due to the MR camera being tilted backwards. In other words, the MR camera cannot see the area 502 in the real world. In other embodiments, the area 502 corresponds with the vehicle camera's housing (or other vehicle occlusion) that interferes with the vehicle camera seeing the real world surrounding the vehicle. In any event, this results in a darkened area 504 in the MR mapped texture. The darkened area 504 can either be no image data, or a darkened area.

As explained above, image harmonization compares the brightness and color components in overlapping regions of interest. When this darkened area 504 is in an overlapping region of interest, it can impede the operability of the harmonization, as these pixels in the area 504 are not of the road surface. For example, the darkened area 504 (FIG. 5B) can correspond with region MR-A (FIG. 2) that is used in the harmonization algorithms. However, due to the tilted camera creating an occlusion of the road surface, these pixels in the areas 504 can skew the brightness and/or color estimates that are being calculated for those areas. This can result in incorrect harmonization corrections being calculated by the harmonization algorithm. For example, the harmonization algorithm may over-correct the image area MR-A, brightening the image area MR for the synthesized top view, resulting in a top view that has a brighter image area MR than, for example, image areas FV and RV.

Therefore, according to various embodiments disclosed herein, solutions to address this issue include adapting the harmonization algorithm when it is determined that at least one of the vehicle cameras (e.g., ML and MR) have been rotated. In embodiments, the disclosed systems can check the extrinsic parameters of the cameras, including the X, Y, and Z positions of the camera with respect to the vehicle coordinate system, and the rotational or angular orientation of the cameras about the X, Y, and Z axes with respect to the vehicle coordinate system. Specifically, if the camera is rotated toward the rear of the vehicle, the rotation of the camera about the Z1 (Y) axis will be significantly different when compared to a camera pointing straight down at the ground. In embodiments, the X, Y, and Z positions and/or angular orientations can be compared to a set threshold, such as 5 degrees, 10 degrees, 15 degrees, 20 degrees, or the like. If the X, Y, and/or Z positions and/or angular orientations deviate from a known position or orientation associated with a camera pointing straight down, then the harmonization algorithm can be modified (or a second harmonization algorithm can be utilized). In embodiments, the threshold value of rotation can be predetermined such that the overlapping regions will contain dark areas of vehicle occlusions, as described above with reference to FIGS. 5A-5B.

In embodiments, the X, Y, and/or Z positions, or the X, Y, and/or Z angular orientations of the vehicle cameras can be retrieved from vehicle calibration data provided by the vehicle OEM. The vehicle calibration data can indicate whether the vehicle is a towing vehicle or not, and therefore whether it is likely that the vehicle camera is rotated rearward.

In other embodiments, the system can perform image processing to determine whether one or more of the vehicle cameras are facing rearward. For example, horizon lines forward and rearward of the vehicle can be compared to one another in the same image, and if those horizon lines are offset (e.g., not parallel) from one another, the system may determine that the camera is tilted toward one of the horizons (e.g., the horizon line that appears lower in the image than the other horizon line). Image processing can also determine the location and presence of the sky, and therefore whether or not the image appears to be tilted rearward based on the orientation of the sky relative to the surroundings.

Figure 6A:
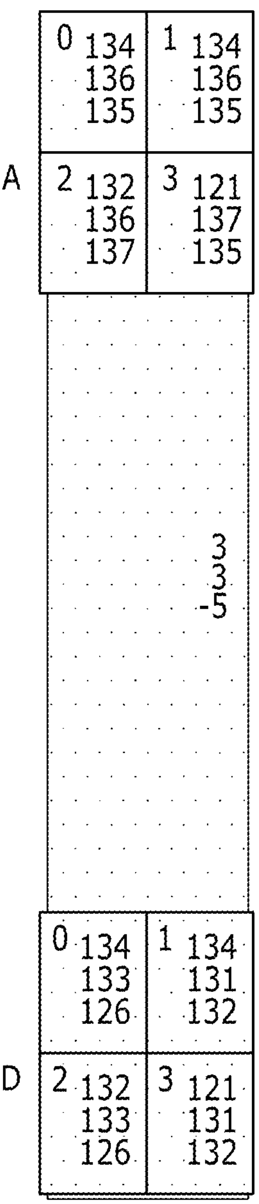
FIG. 6A-6B illustrate projected image areas having a plurality of micro blocks in overlapping regions, according to an embodiment. The projected image area of FIG. 6A is associated with a camera pointing generally toward the ground, and the projected image area of FIG. 6B is associated with a camera tilted generally toward the rear of the vehicle.
Figure 6B:
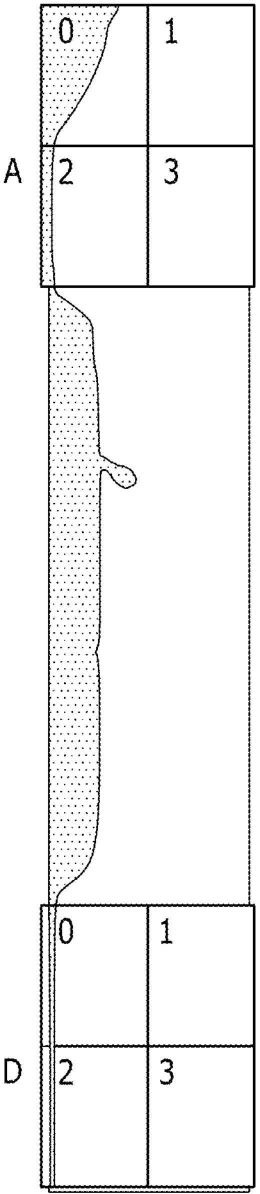

When it is determined that at least one of the vehicle's cameras is tilted rearward, the harmonization algorithm can be adjusted, or a second harmonization algorithm can be utilized. The adjusted or second harmonization algorithm includes an adjustment to how the harmonization algorithm interprets the brightness values and/or color values in the image data within the overlapping regions. For example, in one embodiment, FIG. 6A once again illustrates an MR mapped texture when the vehicle camera is pointing straight down at the round (similar to FIG. 5A), and FIG. 6B illustrates an MR mapped texture when the vehicle camera is rotated toward the rear of the vehicle (similar to FIG. 5B). Each of these views includes an overlapping regions A and D, as explained above with reference to FIG. 2. The overlapping regions A and D of each camera view are divided into four micro blocks or micro regions (also referred to as segments of the overlapping regions), labeled 0, 1, 2, and 3. Of course, more or less than four micro blocks may be utilized for each overlapping region. Brightness values and the color values of the pixels in these micro blocks are generated for each respective micro block. These brightness values and color values in these overlapping region segments are used for image harmonization as described above. Here, the darkened area 504 described with reference to FIG. 5B is shown in micro blocks 0 and 2 of overlapping region A.

Since the system has determined that the vehicle camera MR has been rotated rearward, the second harmonization algorithm can remove the original color and brightness pixel values from micro blocks 0 and 2 in overlapping region A. In its place, the second harmonization algorithm can duplicate the color and brightness values from micro blocks 1 and 3, respectively. The dark areas in micro blocks 0 and 2 are overwritten with color and pixel values that are of the road surface shown in micro blocks 1 and 3. When the harmonization algorithm reads the brightness and color pixel values, it can perform the overwrite function as follows:

MRA_0 = MRA_1;

MRA_2 = MRA_3

While not illustrated, the same can be performed for the ML camera as follows:

MLA_1 = MLA_0;

MLA_3 = MLA_2 such that the micro blocks in region A closest to the vehicle are rewritten with the color and brightness values from their respective adjacent micro block.

Thus, the adjusted harmonization algorithm can have brightness and color value estimates calculated from pixels that represent the road surface, rather than an area of the camera view that is darkened (e.g., area 504) due to the vehicle occlusion or lack of image data when the mirror is tilted with respect to the Z1 axis. Since the original or first harmonization algorithm may require, as input, color values and brightness values associated with each micro block, the inputs for some of the micro blocks (e.g., 0 and 2) can be adjusted to duplicate the color values and brightness values of other micro blocks (e.g., 1 and 3) in the same overlapping region A.

In other embodiments, the brightness and color pixel values in these micro blocks 0, 2 in overlapping region A are simply removed or ignored from the harmonization algorithm.

With this adaption, the systems described herein can have two implementations of the harmonization algorithm integrated into the software. The current implementation default is for the system with two cameras (e.g., ML and MR) pointing towards the ground. This can be referred to as the default harmonization algorithm. The adapted version of the harmonization algorithm for a system that has at least one of the cameras (e.g., ML and/or MR) rotated towards the rear of the vehicle can be referred to as the adapted harmonization algorithm, or second harmonization algorithm. The determination that the angular orientation of the cameras about the Z1 (Y) axis exceeds a threshold can be a trigger for the software to switch from the default harmonization to the adapted harmonization algorithm.

Figure 7A:
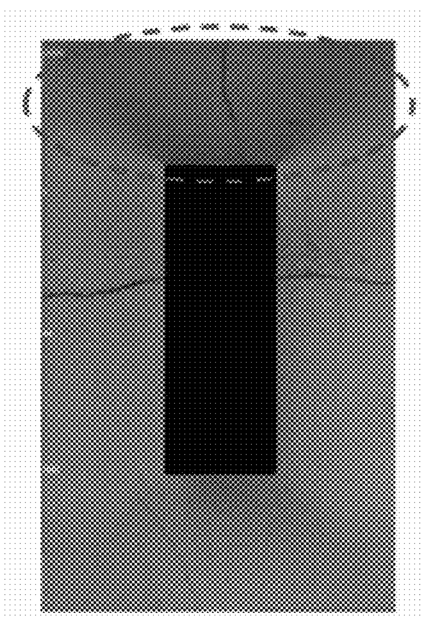
FIG. 7A illustrates an overhead view utilizing a default harmonization.
Figure 7B:
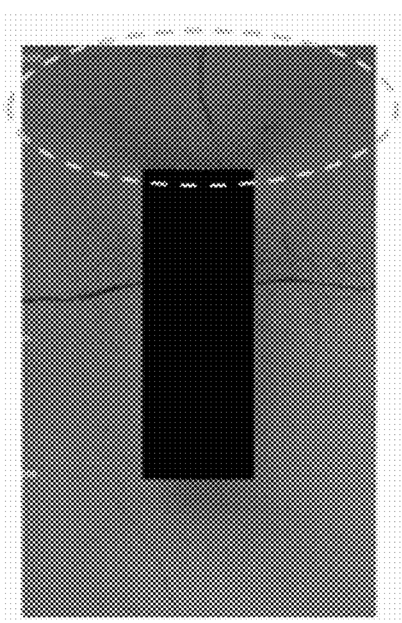
FIG. 7B illustrates the same overhead view utilizing an adapted harmonization.

The result is an improved harmonization performance that can adapt for a system where the size cameras have been rotated toward the rear of the vehicle. For example, FIG. 7A illustrates a top view utilizing the default harmonization algorithm, and FIG. 7B illustrates a top view of the same area surrounding the vehicle utilizing the adjusted harmonization algorithm, both when the side cameras (ML and MR) are rotated back. Note how the circled area in front of the vehicle in the default harmonization (FIG. 7A) is more prevalent due to the vehicle occlusion or lack of image data in segments of the overlapping region. This circled area is not as dark with the adapted harmonization (FIG. 7B) due to the adjustments made to the color and brightness values in some of the segments in the overlapping region, resulting in less overcorrection for the darkened region.

Figure 8:
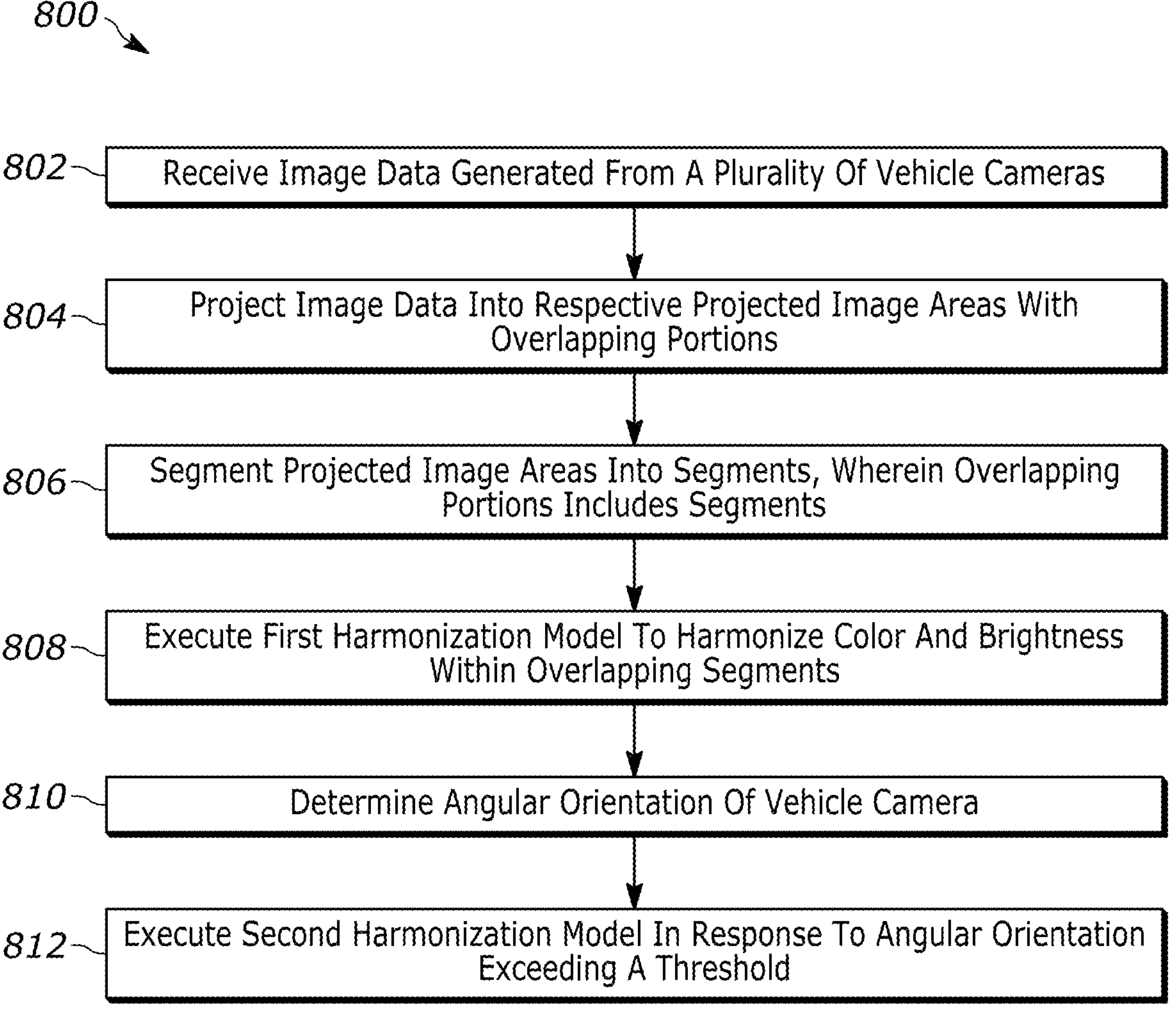
FIG. 8 illustrates an example of a flow chart of a method of harmonizing images based on a detected angular orientation of at least one of the cameras, according to an embodiment.

FIG. 8 illustrates an example of a flow chart 800 of a method or process that can be implemented by the one or more ECUs or processors described herein. For example, these steps may be stored in memory so that, when acted upon by a processor, cause the processor to perform these steps. In some alternative implementations, the functions noted in the flow chart blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flow chart illustration, and combinations of blocks in the block diagrams and/or flow chart illustration, can be implemented by special purpose hardware-based systems that perform the specified functions or acts or carry out combinations of special purpose hardware and computer instructions.

At 802, the processor receives image data generated from a plurality of vehicle cameras. For example, the processor in the ECU 14 can receive image data from the vehicle cameras 16*a-d*. With that image data, at 804 the ECU 14 projects each image into the overhead space. For example, for each image received from the vehicle cameras 16*a-d*, an associated projected image area (e.g., ML, MR, FV, RV) is generated. Each projected image area represents a top view of a portion of a respective one of the images taken from cameras 16*a-d*. Further, each projected image area has a plurality of regions (e.g., A, B, etc.), with at least one of the regions of one of the projected image areas overlapping with another of the regions of another of the projected image areas to define overlapping portions. For example, region A of projected image area MR overlaps with region B of projected image area FV, and thus each region MR-A and FV-B is an overlapping portion.

At 806, each projected image area (or a composite of all of the areas) is segmented into a plurality of segmented blocks, or micro blocks. In particular, each region (e.g., A, B, etc.) is segmented into micro blocks (e.g., 0, 1, 2, 3). Various overlapping regions of interest (ROIs) exist such that micro blocks of a first camera image correspond to micro blocks of a second camera image that overlaps with the first camera image. For example, a micro block 0 of one projected image area (FV-B) corresponds to a micro block 0 of another projected image area (MR-A) generated from another camera. These two micro blocks or segments can be referred to as overlapping segments.

At 808, the ECU 14 generates an overhead composite view utilizing harmonization algorithms described above. The harmonization algorithms harmonize the color and brightness amongst the image data from the various vehicle cameras. Specifically, the color and brightness of each projected image area are harmonized such that the color and brightness values within the overlapping segments equalize. This helps to improve the appearance of the composite image, especially in areas of the composite image that are generated from image data in overlapping regions from two cameras.

At 810, the ECU determines the angular orientation of at least one of the vehicle cameras, such as cameras 16*c* and 16*d*. If either or both of these cameras are tilted to face backward (e.g., about the Z1 axis), the processor can execute a second or adjusted harmonization model. To determine the angular orientation, the ECU or other processor can receive vehicle calibration data that indicates whether the vehicle is a towing vehicle (e.g., pickup truck, SUV) or whether the vehicle is a non-towing vehicle (e.g., sedan). If vehicle calibration data indicates the vehicle is a towing vehicle, it can be inferred that the cameras are tilted to face rearward. Alternatively or additionally, a sensor (e.g., 6 degree of freedom sensor) can be utilized to determine the angular orientation of the associated camera. In other embodiments, a controller and/or actuator that controls movement of the camera can supply data indicating the angular orientation of the actuated camera. For example, if the vehicle is placed in a tow mode, the cameras may be actuated to face rearward, thus supplying the necessary trigger to determine the angular orientation of the camera exceeds the threshold.

At 812, once it is determined that the angular orientation of at least one of the cameras exceeds a threshold and faces rearward, a second or adjusted harmonization model can be executed. The second or adjusted harmonization model can harmonize the projected image areas according to a different methodology. In embodiments, color values and/or brightness values associated with the pixels in some of the micro blocks (e.g., 0, 2) of one overlapping region (MR-A) can be adjusted such that they are duplicates of the color values and/or brightness values associated with the pixels of other adjacent micro blocks (e.g., 1, 3) of the same overlapping region (MR-A).

Once harmonized, the overhead view of the area surrounding the vehicle can be processed for display on a vehicle display. The vehicle display can be a screen (e.g., LCD, LED) of an infotainment center within the vehicle. The vehicle display can also be a mobile device, such as a smart phone communicatively connected to the vehicle.

It should be understood that references to brightness values or color values as disclosed herein are meant to be in the context that either brightness values and/or color values can be processed and adjusted. For example, execution of a harmonization algorithm based on brightness values or color values within the overlapping segments should be interpreted to mean brightness values and/or color values within the overlapping segments. In other words, either one or both of the brightness values or color values can be considered in the harmonization algorithm.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method for generating a top view of an area surrounding a vehicle, the method comprising:

receiving images from a plurality of vehicle cameras, wherein each vehicle camera is configured to view a respective area of ground outside of the vehicle;

projecting the images into corresponding projected image areas, each projected image area representing a top view of a portion of a respective one of the images, wherein each projected image area has a plurality of regions, and wherein at least one of the regions of one of the projected image areas overlaps with another of the regions of another of the projected image areas to define overlapping portions;

segmenting each projected image area into a respective plurality of segments, wherein the overlapping portions include some of the segments of one projected image area and some of the segments of another projected image area to define overlapping segments;

executing a first harmonization model to harmonize the projected image areas based on brightness values or color values within the overlapping segments;

determining an angular orientation of at least one of the plurality of vehicle cameras relative to the ground; and executing a second harmonization model to harmonize the projected image areas based on the brightness values or color values within the overlapping segments, wherein the executing of the second harmonization model is performed in response to a determination that the angular orientation of the at least one of the plurality of vehicles cameras exceeds a threshold.

2. The method of claim 1, wherein the executing of the second harmonization model includes:

selecting a group of the overlapping segments;

adjusting the brightness values or color values of the selected group of overlapping segments; and harmonizing the projected image areas with the adjusted brightness values or color values.

3. The method of claim 2, wherein the adjusting the brightness values or color values of the selected group of overlapping segments causes the brightness values or color values of the selected overlapping segments to be identical to the brightness values or color values of another of the segments.

4. The method of claim 3, wherein the another of the segments is one of the overlapping segments not in the selected group.

5. The method of claim 2, wherein the adjusting the brightness values or color values of the selected overlapping segments includes removing the brightness values or color values of the selected overlapping segments.

6. The method of claim 1, wherein the determining the angular orientation is based on vehicle calibration data.

7. The method of claim 1, further comprising:

generating, for display, the top view based on the executing of the second harmonization model.

8. A method for generating a top view of an area surrounding a vehicle, the method comprising:

receiving images from a plurality of vehicle cameras, wherein each vehicle camera is configured to view a respective area of ground outside of the vehicle;

projecting the images into corresponding projected image areas, each projected image area representing a top view of a portion of a respective one of the images, wherein each projected image area has a plurality of regions, and wherein at least one of the regions of one of the projected image areas overlaps with another of the regions of another of the projected image areas to define overlapping portions;

segmenting each projected image area into a respective plurality of segments, wherein the overlapping portions include some of the segments of one projected image area and some of the segments of another projected image area to define overlapping segments;

determining an angular orientation of at least one of the plurality of vehicle cameras relative to the ground; and harmonizing the projected image areas by altering brightness values or color values within the overlapping segments to generate the top view of the area surrounding the vehicle, wherein the harmonizing is performed based on the determined angular orientation.

9. The method of claim 8, wherein the harmonizing includes:

altering the brightness values or color values within the overlapping segments according to a first harmonization model when the determined angular orientation is of a first angle, and altering the brightness values or color values within the overlapping segments according to a second harmonization model when the determined angular orientation is of a second angle.

10. The method of claim 9, wherein the first angle is perpendicular with the ground, and wherein the second angle is not perpendicular with the ground.

11. The method of claim 10, wherein the second angle is greater than five degrees relative to a perpendicular direction to the ground.

12. The method of claim 8, wherein the harmonizing includes:

selecting a group of the overlapping segments; and adjusting the brightness values or color values of the group of overlapping segments to be identical to the brightness values or color values of another of the segments.

13. The method of claim 12, wherein the another of the segments is one of the overlapping segments not in the selected group of overlapping segments.

14. The method of claim 12, wherein the adjusting includes removing the brightness values or color values of the group of overlapping segments.

15. The method of claim 8, wherein the determining the angular orientation is based on vehicle calibration data.

16. A vehicle camera system for generating a top view of an area surrounding a vehicle, the system comprising:

a plurality of vehicle cameras, each vehicle camera configured to view a respective region of ground outside of the vehicle, wherein portions of at least some of the regions overlap with portions of another of the regions to define overlapping portions;

at least one processor coupled to the vehicle cameras and programmed to:

receive images generated by the vehicle cameras, project the images into corresponding projected image areas, each projected image area representing a top view of a portion of a respective one of the images, wherein each projected image area has a plurality of regions, and wherein at least one of the regions of one of the projected image areas overlaps with another of the regions of another of the projected image areas to define overlapping portions, segment each projected image area into a respective plurality of segments, wherein the overlapping portions include some of the segments of one projected image area and some of the segments of another projected image area to define overlapping segments, execute a first harmonization model to harmonize the projected image areas based on brightness values or color values within the overlapping segments, receive an angular orientation of at least one of the plurality of vehicle cameras relative to the ground, and execute a second harmonization model to harmonize the projected image areas based on the brightness values or color values within the overlapping segments, wherein the execution of the second harmonization model is performed in response to a determination that the angular orientation of the at least one of the plurality of vehicles cameras exceeds a threshold.

17. The system of claim 16, wherein the at least one processor is further programmed to, during the execution of the second harmonization model:

select a group of the overlapping segments;

adjust the brightness values or color values of the selected overlapping segments; and harmonize the images with the adjusted brightness values or color values.

18. The system of claim 17, wherein the adjusting of the brightness values or color values of the selected group of overlapping segments causes the brightness values or color values of the selected overlapping segments to be identical to the brightness values or color values of another of the segments.

19. The system of claim 18, wherein the another of the segments is one of the overlapping segments not in the selected group.

20. The system of claim 16, wherein the angular orientation of at least one of the plurality of vehicle cameras relative to the ground is received from vehicle calibration data.

* * * * *